United States Patent [19]
Iyengar et al.

[11] Patent Number: 6,018,627
[45] Date of Patent: *Jan. 25, 2000

[54] TOOL-INDEPENDENT SYSTEM FOR APPLICATION BUILDING IN AN OBJECT ORIENTED DEVELOPMENT ENVIRONMENT WITH DATA STORED IN REPOSITORY IN OMG COMPLIANT UML REPRESENTATION

[75] Inventors: Sridhar Srinivasa Iyengar, Irvine; James Albert Fontana, Mission Viejo; Norman Roy Smith, Lake Forest; Brian Edward Pattinson, Trabuco Canyon; Anthony Reginald Pitchford, Mission Viejo; Mireille Mathilde Staub, Coto de Caza, all of Calif.

[73] Assignee: Unisys Corp., Blue Bell, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/934,833

[22] Filed: Sep. 22, 1997

[51] Int. Cl.⁷ ...................................................... G06F 9/44
[52] U.S. Cl. ............................................................ 395/701
[58] Field of Search ..................................... 395/707, 701

[56] References Cited

PUBLICATIONS

Rational Rose Using Rational Rose 4.0, Rational Corporation, Dec. 1996.

Rational Rose/C++ Round Trip Engineering with Rational Rose/C++ Rational Corporation, Dec. 1996.

Rational Rose Unified Modeling Language UML&Booch OMT Quick Reference for Rational 4.0, Dec. 1996.

Template Software SNAP 8.0 released Jun. 1997 Chapter 7 Patttern, Jan. 1998.

*Primary Examiner*—Tariq R. Hafiz
*Assistant Examiner*—Todd Ingberg
*Attorney, Agent, or Firm*—J. Ronald Richebourg; Mark T. Starr; Steven B. Samuels

[57] ABSTRACT

A programmed computer system includes a set of development tools, each having a format used to store data and code files. The output data from a developmental tool is transformed into a generic format data which is saved in a repository. The repository also contains all output data, application components, and information as to the relationship between the entities and objects stored in the repository. Each tool employed during the development process puts information into the repository and takes information out of the repository. In this way, the system integrates the tools used in different parts of the development process by passing necessary information from one tool to another. Different tools are employed through each of the development stages, legacy integration, enterprise modeling, domain modeling, writing and editing of business logic, generating skeleton code, component building and wrapping and application deployment.

24 Claims, 18 Drawing Sheets

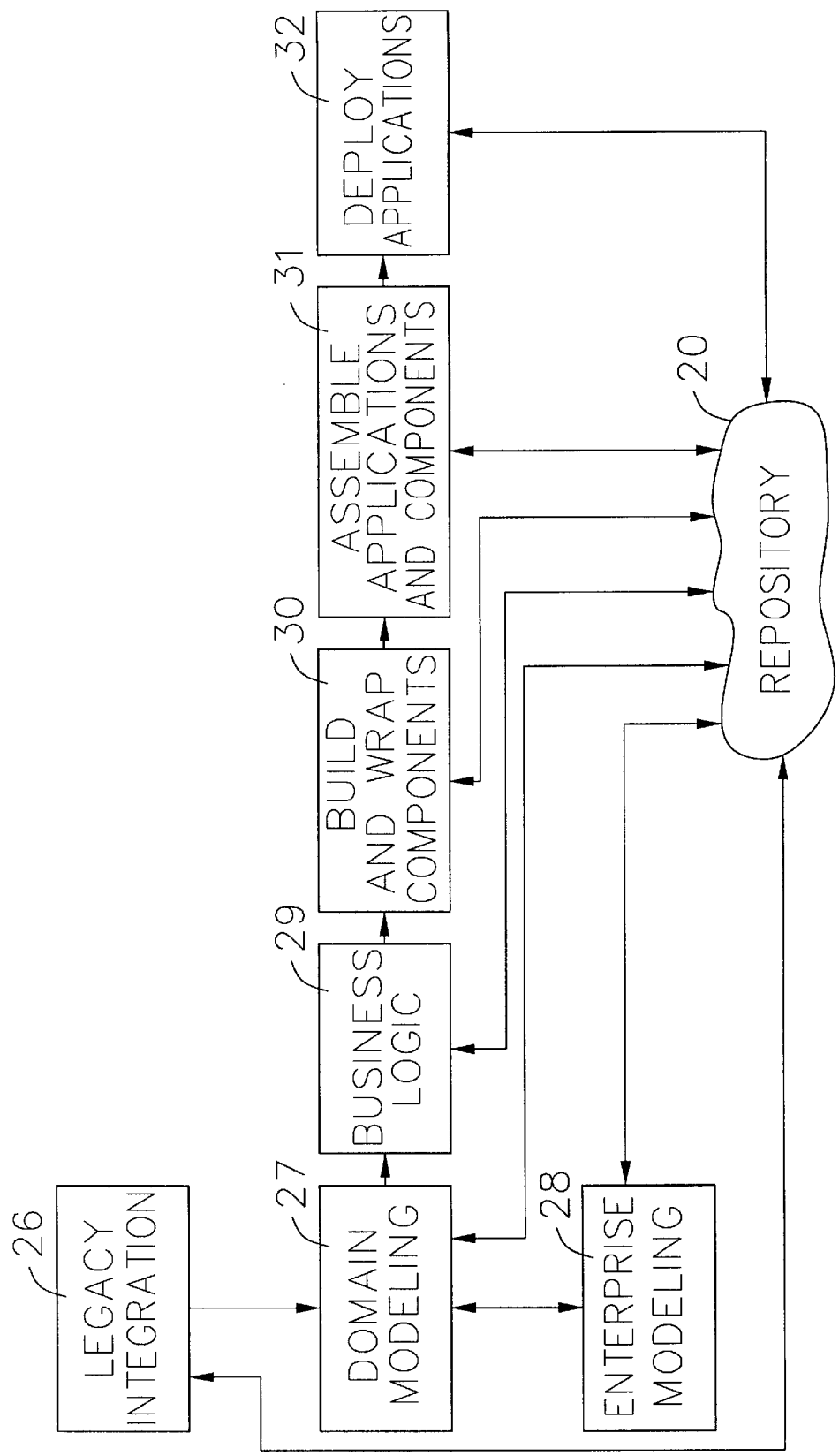

TOOL-INDEPENDENT SYSTEM FOR APPLICATION BUILDING IN AN OBJECT ORIENTED DEVELOPMENT ENVIRONMENT WITH DATA STORED IN REPOSITORY IN OMG COMPLIANT UML REPRESENTATION

FIELD OF THE INVENTION

The present invention relates in general to the field of automated systems for developing business applications. In particular, it relates to a tool-independent business application development system.

BACKGROUND OF THE INVENTION

Business models are often utilized as a blueprint to depict how a company should operate and develop. Depending on the tool utilized, business models may be portrayed in different forms. One of the more common ways of representing business process models is by means of workflow diagrams.

Business process models define business processes. Business processes describe activities that need to be performed within an organization. Examples of such activities may include processing purchase orders, payroll processing, or processing insurance claims. Actual software applications may be derived from business processes. These software applications, in conjunction with other software systems or team of humans, may accomplish a defined business process.

Creation of business applications results in a need for a comprehensive environment that will support the entire business application development process. The process may start with the building of business models and progress to representing the business models as object models. The next step may be creating source code for the business logic, that is, the creation of methods for the business processes that represent details of how the business runs. For example, if the business process is the handling of purchase orders, one detail about how this process is accomplished may be that purchase orders over $1,000 must be approved by a manager. The development process may then proceed to building and wrapping components (reusable pieces of code), building applications from the components, and installing the new applications and components into the appropriate environments.

The development process results in a further need to discover legacy systems, that is, existing applications, components, business processes, or other legacy systems, and integrate them into new business models which may in turn generate new business applications. The incorporation of existing legacy items into new applications will help preserve investments made in creating the legacy systems.

The current technology does not adequately address these needs. Although there are tools which allow implementation of parts of the development process, no one single environment exists which supports the process from beginning to end.

Another shortcoming of existing technology is the lack of ability to discover existing legacy items and incorporate them into new applications. Although there are tools that allow transformation of some legacy items into certain kinds of object models, these tools do not utilize the models to generate business applications. Furthermore, these tools are limited in their reverse engineering capabilities, and are also not generalized, meaning that they are able to transform only certain types of legacy items into object models.

Another reason why existing technology does not adequately support legacy integration is because of the lack of a defined method to exchange relevant information between object models. Object models are often created to define the business objects used by various business processes. But because there is no defined method of exchanging information between object models that utilize different object modeling methods, objects appearing in one model cannot be utilized in another modeling tool.

A further shortcoming of the current technology is the lack of tool and middleware independence in creating business applications. As an example of this shortcoming, if one tool is used to develop the business process model, one might be bound in the selection of the tools to create the application source code for the model. The lack of tool independence is mainly due to the inability to exchange information between tools.

Existing technology also does not allow specification and/or generation of source code for applications in a middleware-independent form. Thus, a component of an application built with one middleware cannot be automatically reused in a different environment with a different middleware.

SUMMARY OF THE INVENTION

A programmed computer system according to the present invention attacks many of these problems. The programmed computer system includes a set of development tools, each having an input for receiving input data and each generating output data. The output data is transformed into a generalized format data based on a set of object classes defined and stored in a repository.

The current invention uses the Unified Modeling Language ("UML") object model as the generic format of representing much of the output data. Once output data is transformed into a UML model, it is saved in the repository. The repository also contains all output data, application components, and information as to the relationship between the entities and objects stored in the repository.

Each tool employed during the development process puts information into the repository and takes information out of the repository. In this way, the system integrates the tools used in different parts of the development process by passing necessary information from one tool to another.

The development process supported by the system may generally start with legacy integration, enterprise modeling, or domain modeling. During legacy integration, third party tools are used to discover existing legacy systems. Discovered legacy items are then transformed into UML and may then be transformed to other object models or business process models.

The enterprise modeling stage and the domain modeling stage involve, respectively, the use of third party tools to create business process models and object models. These models are translated into UML and saved in the repository.

The next step in the development process supported by the system is the writing and editing of business logic, that is, the methods for the business processes. The system allows developers to use the language of their choice in writing the methods. In addition, the system generates a skeleton code based on the information in the UML model. This code is also saved in the repository.

The methods are then built and wrapped into components in the component building phase. Built components are assembled into applications in the application assembly stage. Finally, applications are deployed to the appropriate environments in the application deployment stage.

The system also allows a developer to perform various administrative tasks. These tasks may include adding, updating, or configuring new development tools. The user may also browse, search and install application components. The user may further catalog, browse and manage the objects in the repository.

BRIEF DESCRIPTION OF THE DRAWINGS

FIG. 1 is a diagram illustrating the general flow of the development process.

DETAILED DESCRIPTION

Figure 2A:
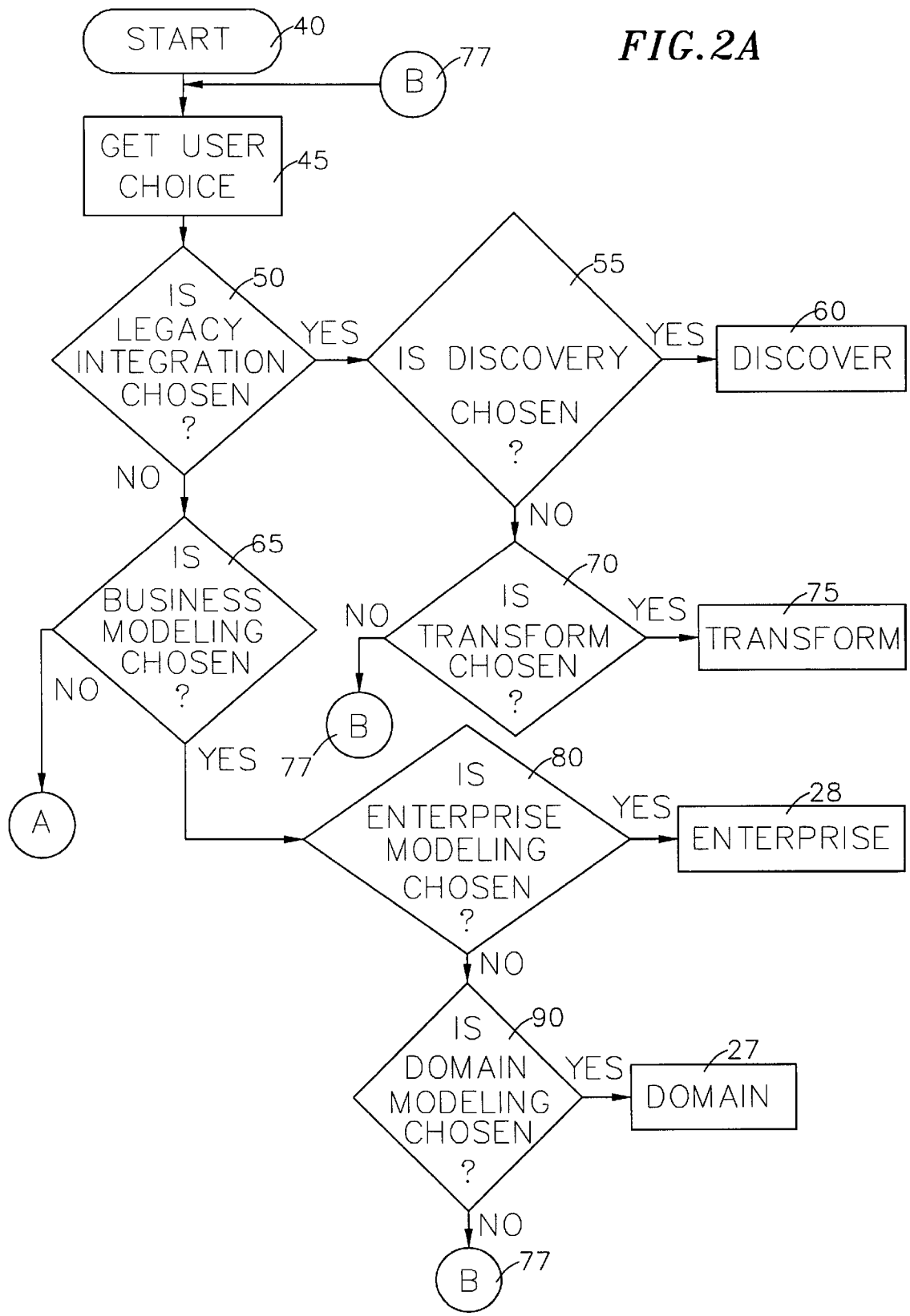
FIGS. 2a–2b are flow diagrams illustrating the execution of the shell process.

The preferred embodiment of the present invention comprises of a computer system having a user interface, a memory, a repository, and a set of third party tools. The computer system may be one of any variety of heterogeneous platforms, including PCs, Unix, Macintosh and Unisys systems. A user may select among various third party tools provided by the shell process to implement each stage of the application development. The shell process invokes the third party tools and coordinates the transfer of control between them.

FIG. 1 shows the general flow of the application development process supported by the system. During legacy integration 26, legacy items are either discovered or transformed. Legacy items may include pre-existing applications, components, business processes, or other legacy systems. The discovered legacy items may then be transformed into business or object models, or into reusable components.

During the enterprise modeling 28 stage, business process models are created and saved in the repository 20.

Object models are created during the domain modeling 27 stage. Object models contain a variety of diagrams, including class diagrams. Object models may also contain use cases and some logic, such as state diagrams.

Class diagrams describe the types of objects in a system and the various kinds of relationships which exist between them. Three main kinds of relationships are associations (e.g. a customer may rent a number of videos, the association being between a customer and videos), subtypes (e.g. a doctor is a kind of person), and aggregations (e.g. an engine is part of an automobile). A subtype relationship is between types; association and aggregation relationships are between objects.

The next step in the development flow may be to write and edit business logic, that is, the methods for the business processes. This is accomplished in the business logic 29 stage. The methods are then built and wrapped into components in the component building phase 30. Built components are assembled into applications in the application assembly stage 31. Finally, applications are deployed to the appropriate environments in the application deployment 32 stage.

Each tool employed during the development process puts information into a repository 20 and takes information out of the repository 20. In this way, the system integrates the tools used in different parts of the development process by passing necessary information from one tool to another.

The repository 20 is, therefore, the central store of all information. All of the entities and objects associated with the application under development, as well as relationships between these entities and objects, are stored in the repository 20. For example, the repository 20 may contain all of the business models, business logic application code, and binary components associated with an application.

The repository 20 further includes tools for cataloging, browsing, and managing components that make up an application. Methods to support these services are disclosed in several patents and patent applications assigned to the assignee of this application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; pending application Ser. No. 08/623,490, filed on Mar. 28, 1996, for A METHOD FOR MAPPING TYPES IN A MODEL IN A OBJECT-ORIENTED REPOSITORY TO LANGUAGE CONSTRUCTS FOR A C BINDING FOR THE REPOSITORY; pending application Ser. No. 08/567,394, filed on Dec. 1, 1995, for METHOD FOR GENERICALLY INVOKING OPERATIONS IN AN OBJECT ORIENTED REPOSITORY; pending application Ser. No. 08/549,352, filed on Oct. 27, 1995, for A METHOD FOR GENERATING OLE AUTOMATION AND IDL INTERFACES FROM META-DATA INFORMATION; pending application Ser. No. 08/505,140, filed on Jul. 25, 1995, for A METHOD FOR PROVIDING OBJECT DATABASE INDEPENDENCE IN A PROGRAM WRITTEN USING THE C++ PROGRAMMING LANGUAGE; pending application Ser. No. 08/506,647, filed on Jul. 25, 1995, for A METHOD FOR GENERICALLY MANIPULATING PROPERTIES OF OBJECTS IN AN OBJECT ORIENTED REPOSITORY; pending application Ser. No. 08/489,313, filed on Jun. 9, 1995, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY, each of which are hereby incorporated by reference as if set forth in full herein.

The shell process allows users to enter the development process at any stage. As an example, the user may decide to skip the enterprise modeling 28 stage entirely and go straight into domain modeling 27. The system therefore naturally supports the highly iterative nature of application development.

The system also supports legacy integration 26. This is achieved by allowing discovery and access to legacy items at run time, and transforming them into Rational's Unified Modeling Language (UML) object models. UML is a method for specifying, visualizing, and documenting the components (objects) of a system under development. Existing object-oriented methods all use different, and often conflicting, terminology to represent object-oriented concepts such as classes, associations, subtypes, and aggregations. UML is the result of an effort to create standardization in the various object-oriented methods.

UML is used in the preferred embodiment of this invention as a neutral object model. Alternative embodiments for specific types of models may use future standard models, such as the Business Object Facility and Common Business Objects, which are currently under development by the Object Management Group, as well as the upcoming Workflow Coalition workflow model.

Once legacy systems, object models, and business process models are transformed into UML, the resulting UML model is stored in the repository 20. The UML model may later be transformed into any other business process model or object model. The new business or object models may, in turn, become the basis for new applications.

Tool independence is another feature supported by the system. The system allows tools used in one stage of the development process to transfer information to other tools used in other parts of the process by means of the repository 20. In other words, the repository 20 allows specific attributes to be attached to the applications under development in one part of the development flow, and those same attributes can be interrogated and used by other tools in other parts of the development flow. Developers may therefore freely choose among the most popular development tools for any stage of the development process without worrying about the coordination of these tools.

The system also provides middleware independence. This is achieved by creating and maintaining source code for the various components of the applications in a middleware-independent form. Middleware may be described as software that provides connectivity between clients and servers. These may include connectivity to database, or messaging connectivity.

The creation of middleware independent components allows developers to delay the need to decide which middleware is to be used until the components are built. This permits the same components to be used in different environments with different middlewares.

Figure 2B:
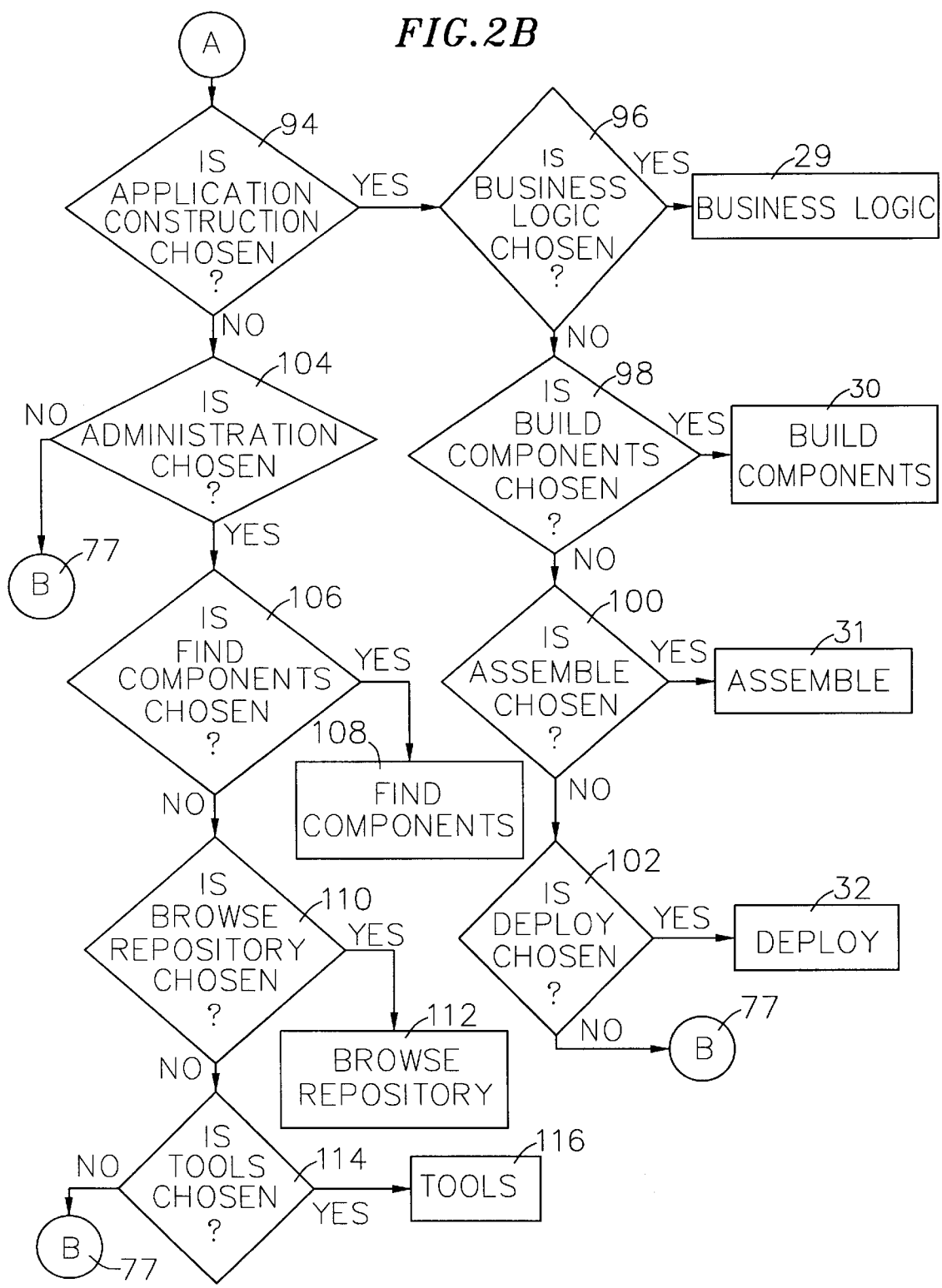

FIGS. 2a–2b are flow diagrams illustrating the execution of the shell process. The process begins in the start bubble 40. From here, the user may chose to perform any part of the development process shown in FIG. 1, including legacy integration 26, domain modeling 27, enterprise modeling 28, creation of business logic 29, component building 30, application assembly 31, and application deployment 32.

Once the routine gets the user choice 45, an inquiry is made as to whether or not the choice is legacy integration (decision diamond 50). If the answer is YES, then a branch is taken to another inquiry as to whether or not to discover existing legacy items (decision diamond 55). An affirmative answer to this inquiry invokes the discover process 60. The discover process is explained below in conjunction with a more detailed description of FIG. 1.

If discovery is not chosen, a further inquiry is made as to whether or not the user chooses to transform discovered legacy items (decision diamond 70). The transform process 75 is invoked upon a YES answer. The transform process 75 is also explained below in conjunction with a more detailed description of FIG. 1. If the user does not choose to transform, the routine waits for a new user choice 77.

If the user choice is not legacy integration, as depicted by the NO branch to decision diamond 50, a determination is made as to whether or not business modeling was selected (decision diamond 65). If the user chooses to do business modeling, an inquiry is made as to whether or not enterprise modeling was chosen (decision diamond 80). Enterprise modeling is the creation of business process models. If the answer is YES, then the enterprise modeling 28 process is invoked. This process is explained below in conjunction with a more detailed description of FIG. 1.

If the answer to decision diamond 80 is NO, a further inquiry of whether or not domain modeling is to be done is made (decision diamond 90). Domain modeling is the creation of object models. The domain modeling 27 process is invoked upon an affirmative answer. This process is also explained below in conjunction with a more detailed description of FIG. 1. A negative answer causes the routine to wait for a new user choice 77.

The user may also choose not to do business modeling, as depicted by the NO branch to decision diamond 65. In this case, an inquiry is made as to whether or not application construction was chosen (decision diamond 94). Under this selection, the user has a choice to write the source code for business logic applications, build components, assemble the components, or deploy assembled components. These processes are explained below in conjunction with a more detailed description of FIG. 1.

If the user chooses to do application construction, as reflected by the YES branch to decision diamond 94, a further inquiry is made in decision diamond 96 as to whether or not the user has selected to do business logic. An affirmative answer to this inquiry invokes the business logic 29 process.

A negative answer leads to the inquiry of whether or not the user wants to build components (decision diamond 98). The component building 30 process is invoked upon a YES answer. If the answer is NO, a further inquiry of whether or not the user wants to assemble the components is made (decision diamond 100). The YES branch invokes the application assembly 31 process. The NO branch results in a final inquiry of whether or not the user choice is to deploy assembled applications (decision diamond 102). If it is, the application deployment 32 process is invoked. If the user has made none of the choices available under application construction, as depicted by the NO branch from decision diamond 102, the routine waits for the user to make a new choice 77.

Referring back to decision diamond 94, an answer of NO to the inquiry of whether application construction was chosen leads to a further inquiry of whether administration was chosen (decision diamond 104). Administrative functions are not part of the development flow. They may be invoked at any time to manage the development environment. Administrative functions include browsing, searching, and installing components, browsing repositories 20 (shown in FIG. 1), or installing and configuring third party tools.

In decision diamond 104, then, if the user wants to perform administrative tasks, an inquiry is made as to whether or not the user has chosen to find components (decision diamond 106). If this is the case, the find components process is invoked 108 to allow the user to browse, search, and install components.

Otherwise, a further inquiry is made in decision diamond 110 as to whether or not the user choice is to browse the repository 20. If the user wants to browse, the browse repository process 112 is invoked. The user may then view information in the underlying repository 20 by means of a generic repository browser.

If the user does not want to browse, as reflected by the NO branch from decision diamond 110, a final inquiry is made as to whether or not a tools choice was made (decision diamond 114). A YES answer invokes the tools process 116 which allows third party tools to be installed and configured. A NO answer causes the routine to wait for a new user choice 77.

Figure 3:
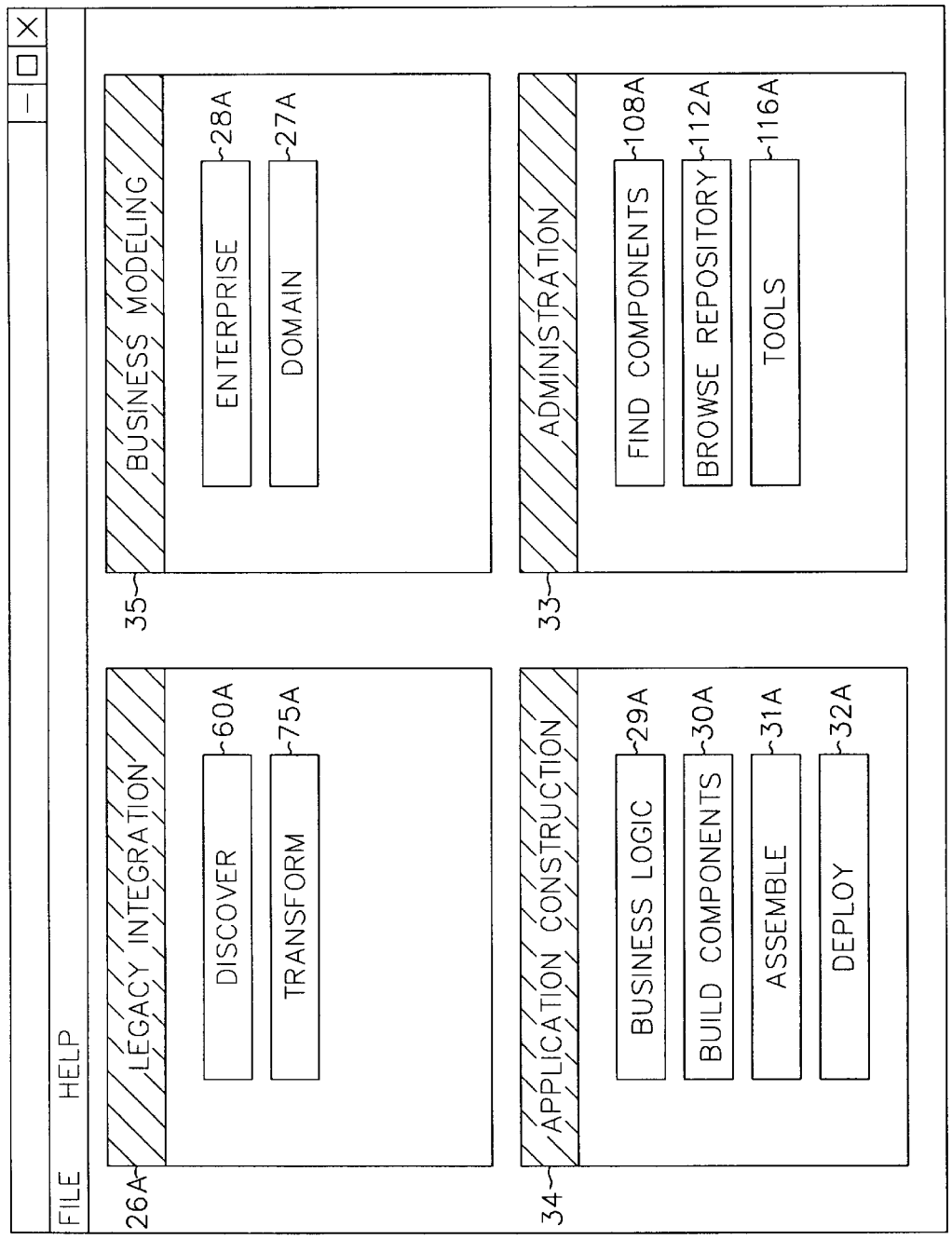
FIG. 3 illustrates a sample screen presentation of the shell process.

FIG. 3 is a sample screen presentation of the shell process. It consists of a legacy integration window 26a, business modeling window 35, application construction window 34, and administration window 33.

The legacy integration window 26a contains two user options, a discover option 60a and a transform option 75a. These allow a user to discover legacy systems and transform them into UML, which may then be transformed to other object models and business process models.

The business modeling window 35 allows the user to do the enterprise modeling 28 or domain modeling 27 steps illustrated in FIG. 1. Thus, a user may select the enterprise button 28a or the domain button 27a to invoke the respective processes.

The application construction window 34 presents the user with a business logic button 29a, build components button 30a, assemble button 31a, and a deploy button 32a. These buttons invoke, respectively, the business logic 29, component building 30, application assembly 31, and application deployment 32 processes shown in FIG. 1.

Figure 4:
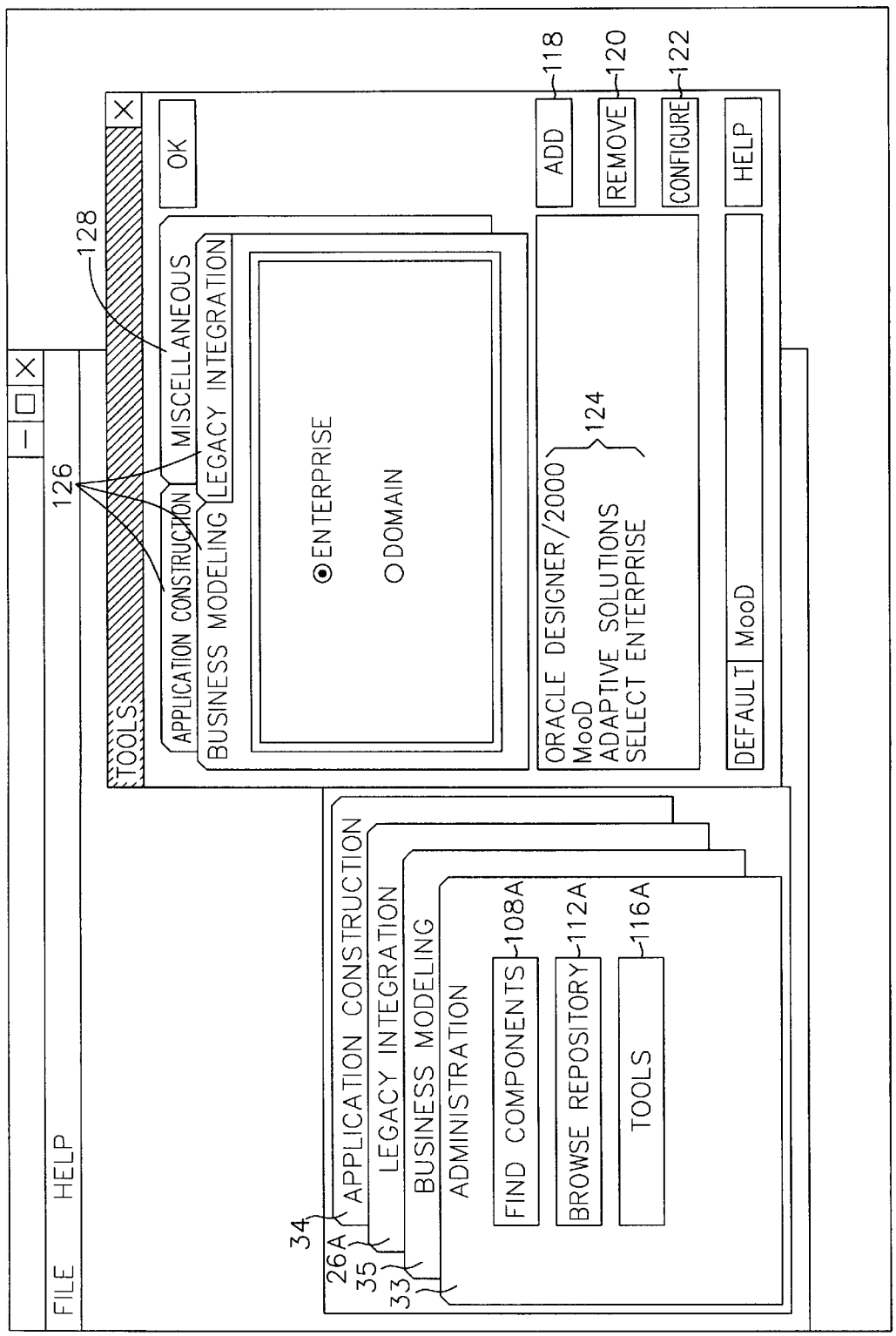
FIG. 4 illustrates a sample screen presentation for the tools process of the administrative phase.

Under the administration window 33, users may perform several administrative tasks. They may browse, search, and install components by selecting the find components button 108a. They may also view information in the underlying repository 20 shown in FIG. 1 by selecting the browse repository button 112a. Finally, users may also install and configure third party tools by selecting the tools button 116a. FIG. 4 shows the user interface screen upon a selection of the tools button 116a. The system allows users to add 118, remove 120, or configure 122 different tools 124 to be used in different stages of the development process 126 as well as other miscellaneous tools 128.

With a better understanding of how the shell process operates, then, it is now appropriate to give more detailed descriptions of each of the major stages of the application development process.

Referring back to FIG. 1, the legacy integration 26 phase may consist of a discover process 60 and a transform process 75 (see FIG. 2a). The discover process 60 invokes third party tools such as Microsoft CEDAR (which is a trademark of Microsoft Corp.) to get an inventory of the existing legacy environment. This existing environment may include transactions such as BEA Tuxedo (which is a trademark of BEA Systems, Inc.) or CICS (which is a registered trademark of IBM Corporation). The environment may also include relational database schema such as Oracle (which is a registered trademark of Oracle Corporation), SQL server, or DB2 (which is a trademark of IBM Corporation). The environment may further include source code, such as COBOL, RPG (report program generator), or PL/1, as well as libraries and their entry points. In addition, the environment may include object transaction server components such as ActiveX (which is registered trademark of Microsoft Corporation) or Java, or COTS (commodity off the shelf) applications, such as Excel (which is a registered trademark of Microsoft Corporation) or SAP (which is a trademark of SAS Institute, Inc.) Once the legacy items have been discovered, they are saved in the repository 20.

Figure 5:
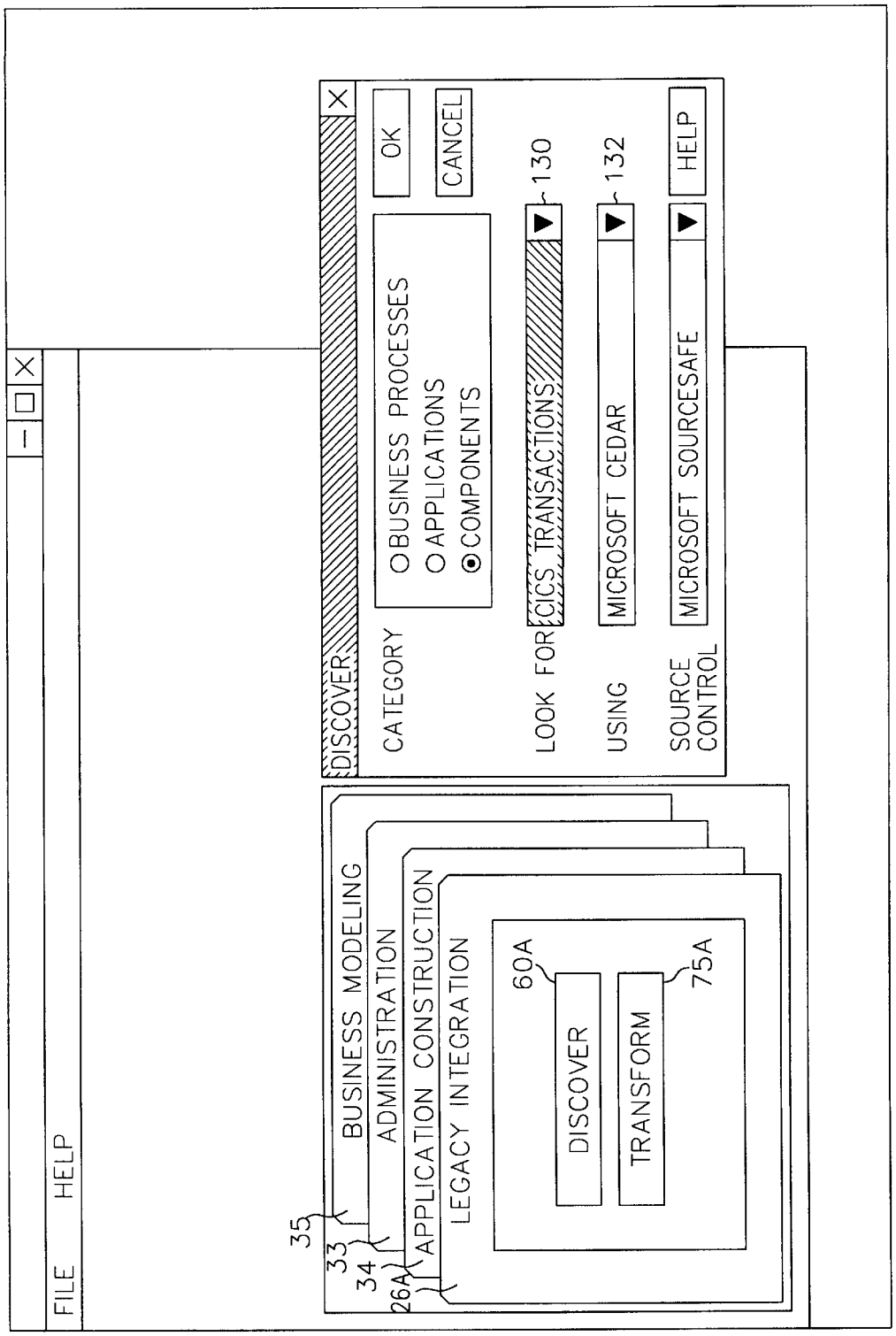
FIG. 5 illustrates a sample screen presentation for the discover process of the legacy integration phase.

FIG. 5 shows the user interface for the discover process 60 (see FIG. 2a). In this example, CICS transactions 130 are to be discovered using the third party tool Microsoft CEDAR 132.

During the transform process 75 (see FIG. 2a) of legacy integration 26 (see FIG. 1), discovered legacy items are transformed into UML models. Transformation of legacy items into UML is described more in detail in the U.S. patent application submitted on the same day as this application (Sep. 22, 1997), also assigned to the assignee of this application, entitled EXCHANGING INFORMATION BETWEEN DIFFERENT OBJECT MODELS AND THE UNIFIED LANGUAGE MODELING MODEL ("Transformation Algorithms"), Ser. No. 08/934,834 which is incorporated by reference as if set forth in full herein. After transformation has been accomplished, the resulting UML model is saved in the repository 20.

Once a discovered legacy item has been transformed into UML, it may then be transformed into other object or enterprise models by means of the Transform Algorithms.

Figure 6:
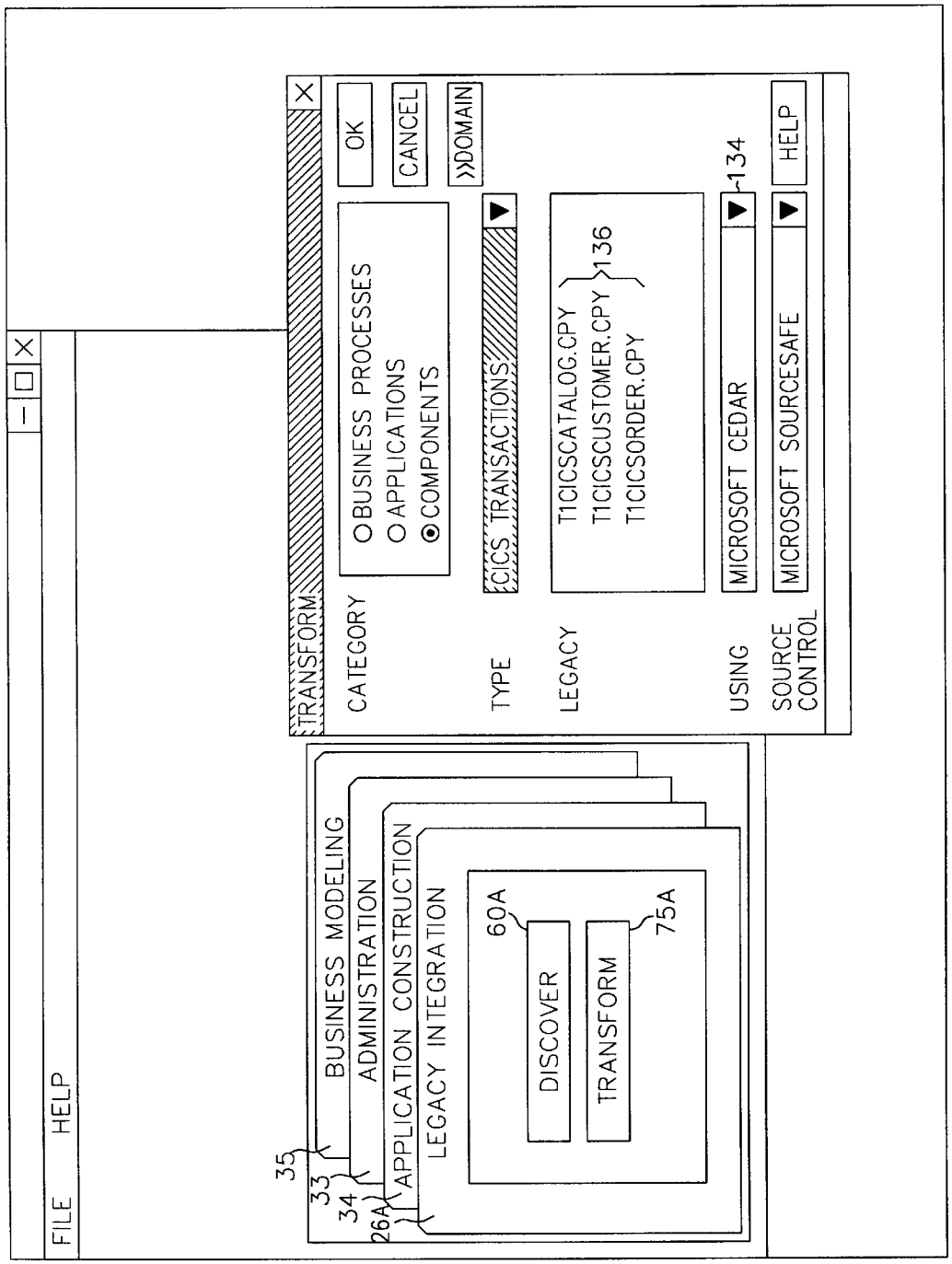
FIG. 6 illustrates a sample screen presentation for the transform process of the legacy integration phase.

FIG. 6 shows the user interface for the transform process 75. In this example, Microsoft CEDAR 134 has been invoked to transform discovered legacy items 136 into a domain model.

The development process shown in FIG. 1 may also involve business modeling. The business modeling phase entails the creation or modification of business process models by means of the enterprise modeling 28 process. Third party tools such as MooD (which is a trademark of MooD International, Ltd.), Designer/2000 (which is a registered trademark of Oracle Corporation), Adaptive Solutions (which is a registered trademark of Adaptive Solutions, Inc.), and Select Enterprise (which is a registered trademark of Select Software Tools, Inc.) may be utilized to build business process models.

Figure 7:
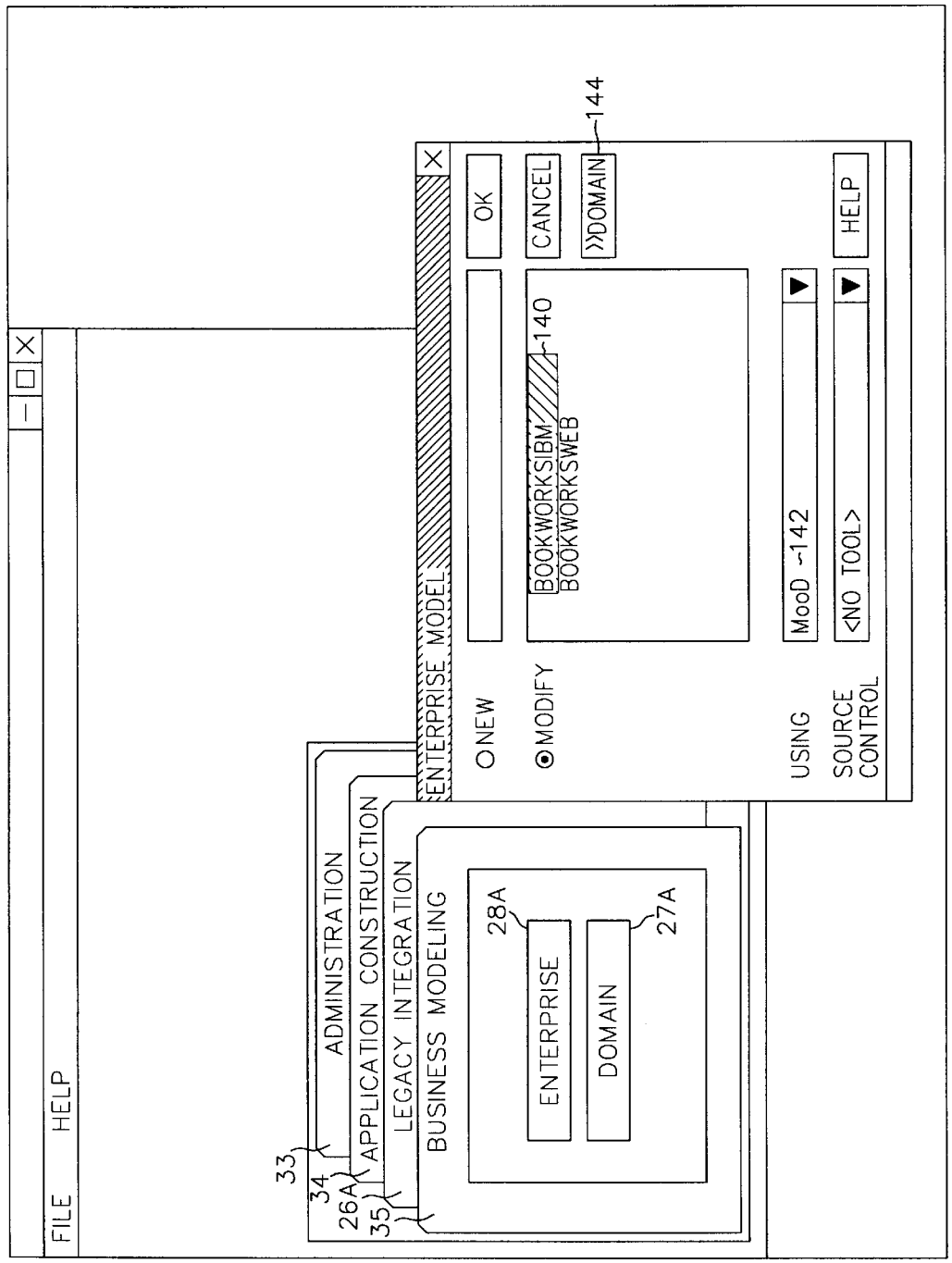
FIG. 7 illustrates a sample screen presentation for the enterprise modeling process of the business modeling phase.

FIG. 7 shows the user interface for the enterprise modeling 28 process shown in FIG. 1. Here, an existing business process model 140 has been selected to be modified by using MooD 142, an enterprise modeling tool. The domain button 144 provides the user interface to transform a selected enterprise model into a domain model should the user choose to do so.

The result of the enterprise modeling process 28 shown in FIG. 1 is saved in the repository 20. Two methods may be employed to accomplish this. Under one method, objects created by the enterprise modeling tool are transformed and saved directly as UML models by means of the Transformation Algorithms. Under another method, data from the modeling tool is exported into a database, and the database is saved into the repository. Data from the database is then imported into a UML model by means of the Transformation Algorithms.

The next step of the development flow may be the creation of object models. Object models may be constructed or modified during the domain modeling 27 process from transformed legacy items or from enterprise models. The system, moreover, allows reverse engineering of object models into enterprise models.

Domain models are constructed by invoking third party tools under the control of the shell process. Examples of domain modeling tools are Rational Rose (which is a registered trademark of Rational), ERWin (which is a registered trademark of Logic Works, Inc.), and Designer/2000. It is noted that these tools may or may not utilize the UML method. The results of domain modeling are saved in the repository 20 by any of the two methods described for the enterprise modeling process 28.

Figure 8:
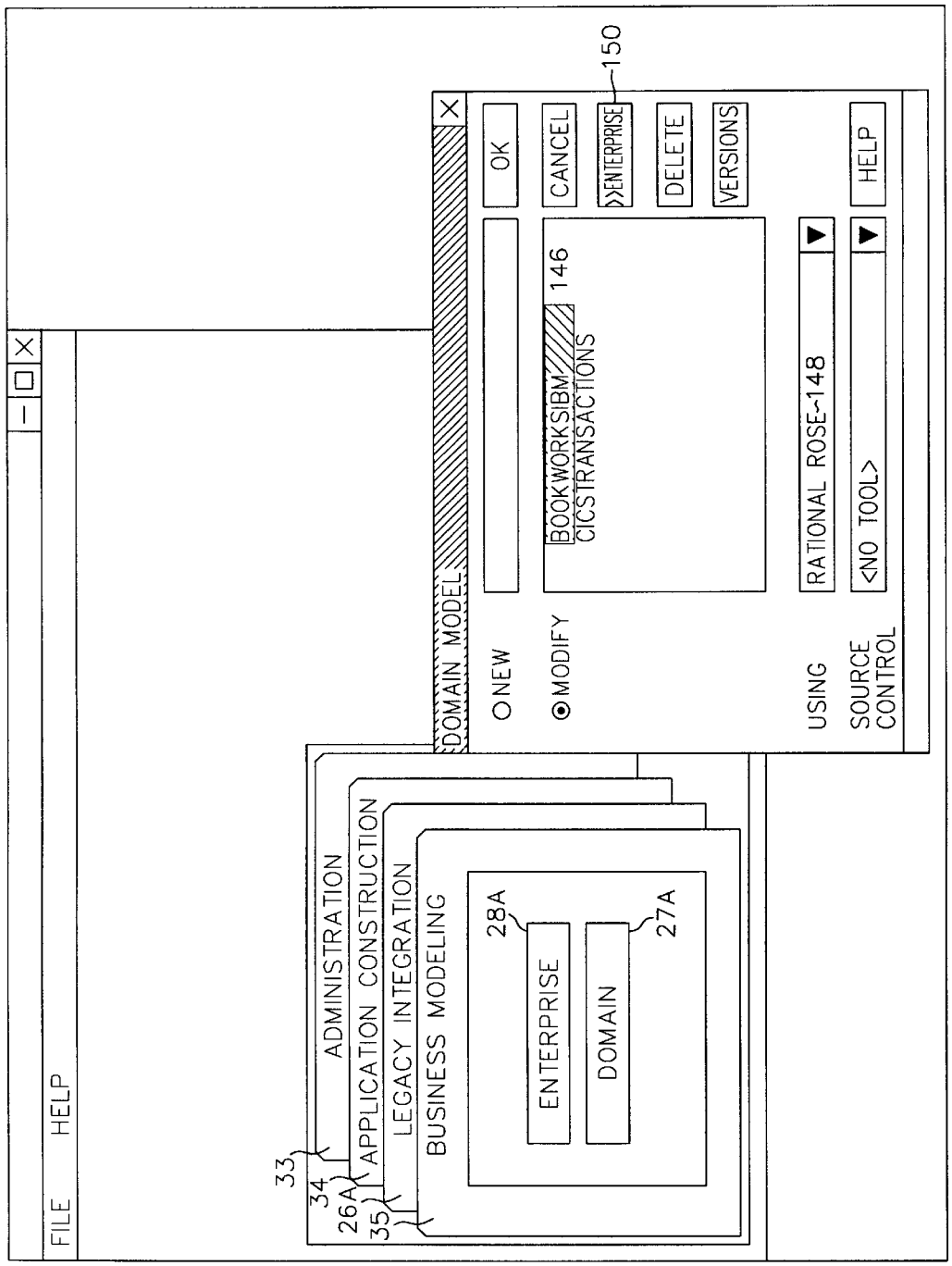
FIG. 8 illustrates a sample screen presentation for the domain modeling process of the business modeling phase.

FIG. 8 is the user interface for the domain modeling 27 process shown in FIG. 1. Here, an existing domain model 146 has been selected to be modified by using Rational Rose 148, a domain modeling tool. The enterprise button 150 provides the user interface to abstract a domain model into an enterprise model should the user choose to do so.

Referring back to FIG. 1, the next step in the development flow may be the creation of business logic 29. During this stage, source code for the business logic (methods) are written and edited. The system allows developers to use the language of their choice in writing the methods, including Java, C++, Visual Basic (which is a registered trademark of Microsoft Corporation), or COBOL.

In addition, skeleton code is generated based on the information in the UML model for the selected classes. A developer may build on the skeleton code to create the methods. Because the code is generated in a middleware "neutral" format, the developer is free to construct the methods independent of the final deployment environment. This allows the developer to concentrate only on the behavior of the method and not worry about access of the methods until component build time.

Figure 9:
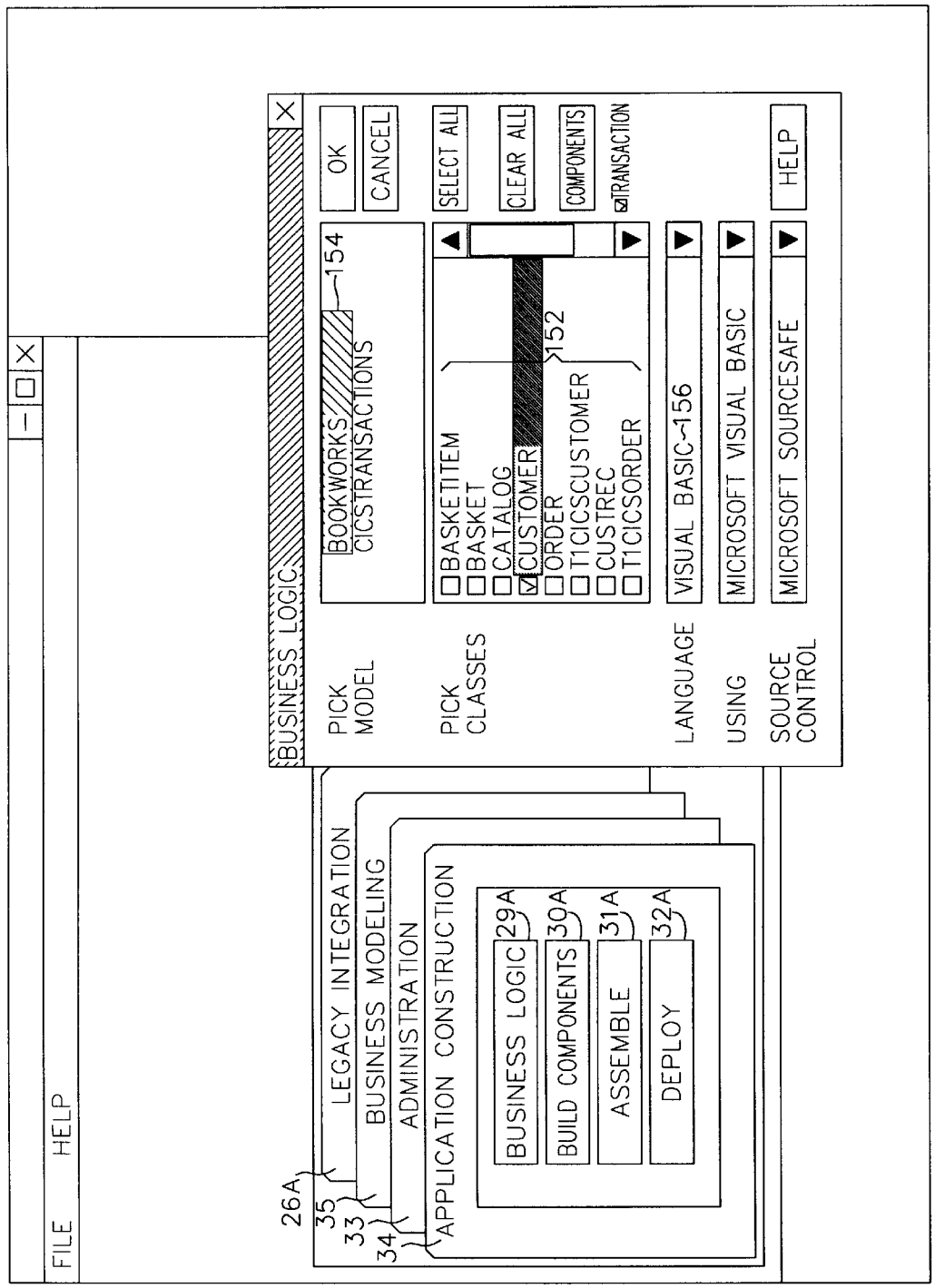
FIG. 9 illustrates a sample screen presentation for the business logic phase.

FIG. 9 shows the user interface for the business logic 29 phase shown in FIG. 1. Displayed in 152 are the classes in the selected model 154. In this example, Visual Basic 156 is chosen as the language to write the methods.

Figure 10A:
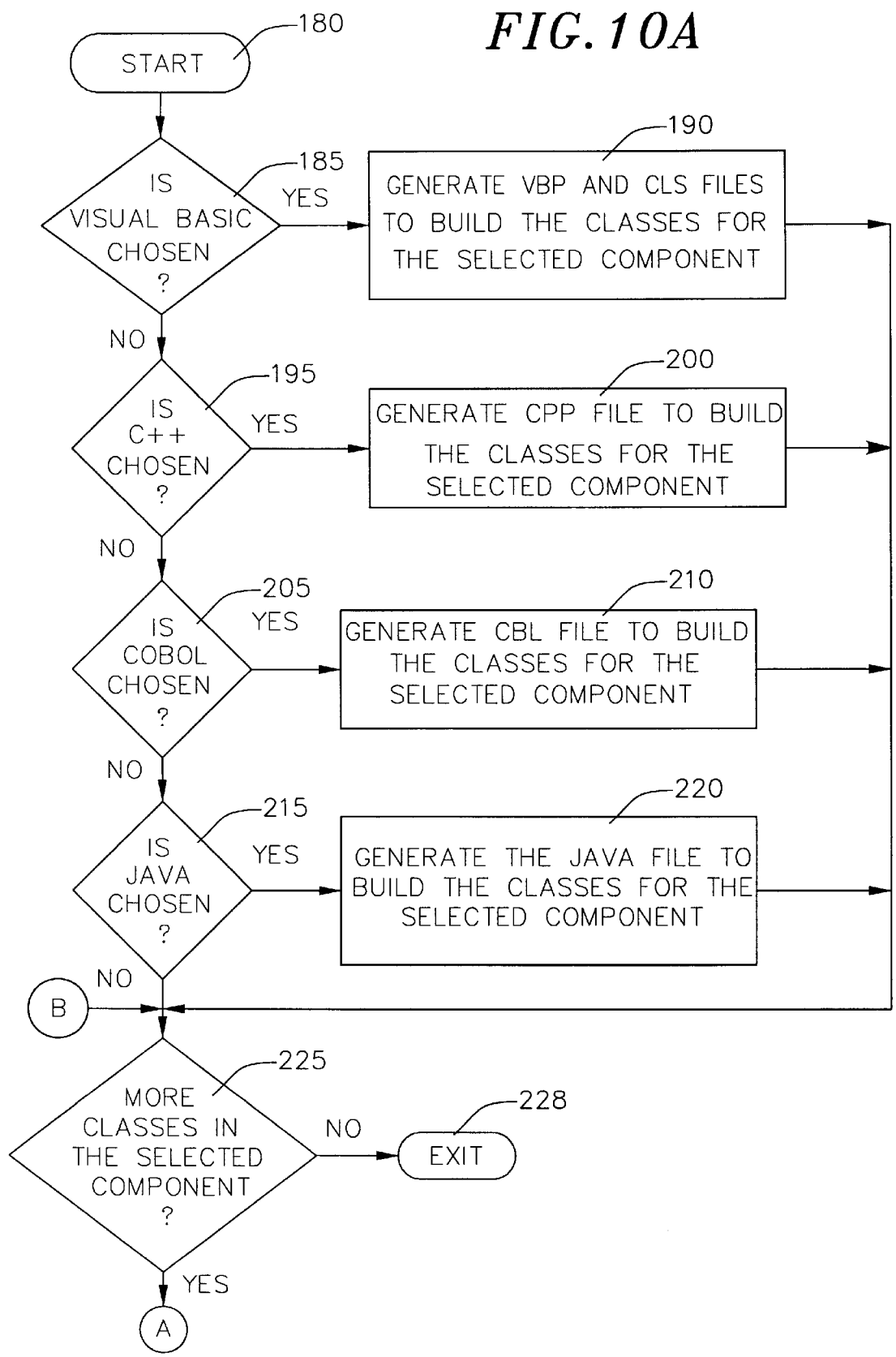
FIGS. 10a–10c are flow charts illustrating the creation of a Visual Basic skeleton code during the business logic phase.
Figure 10B:
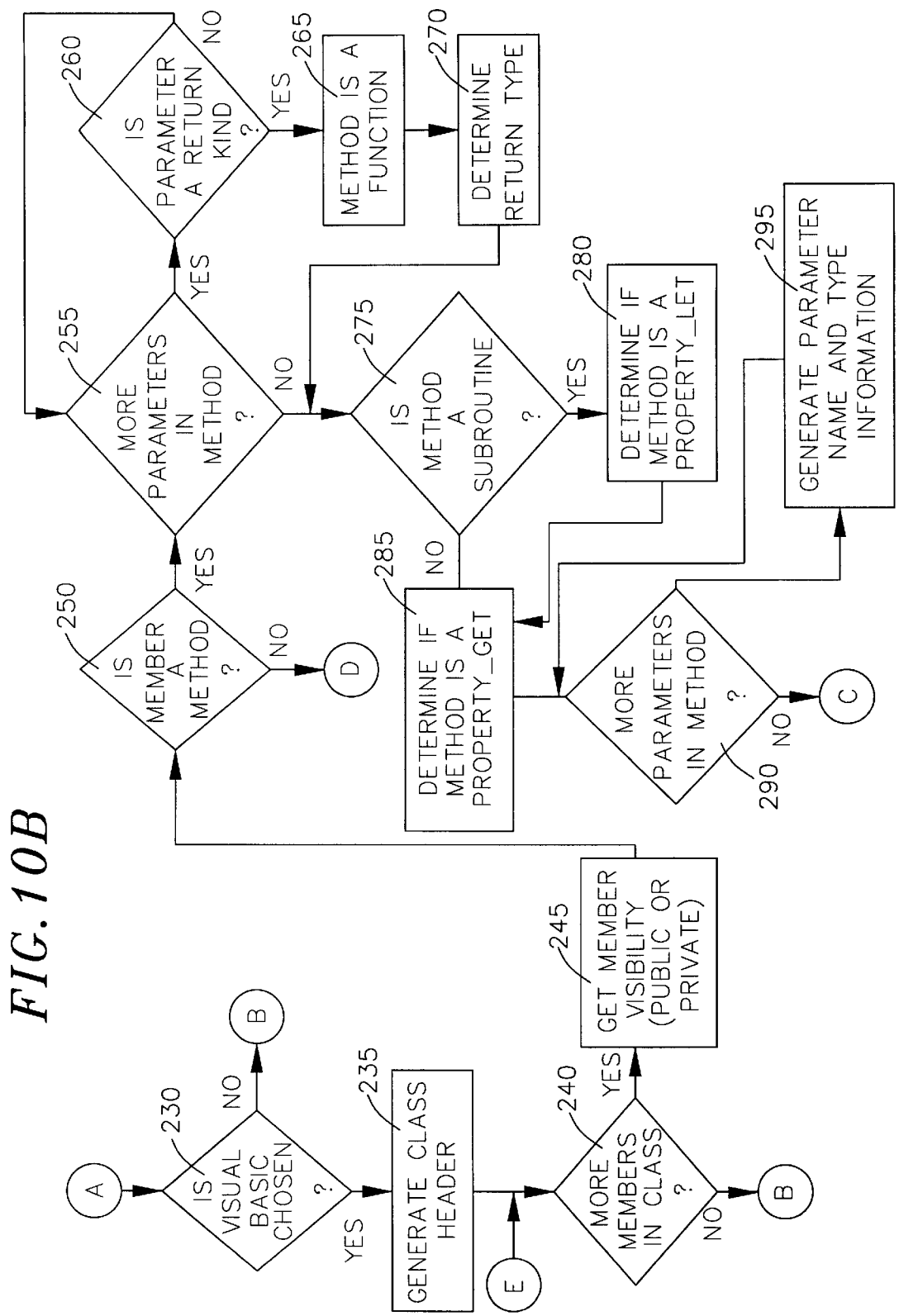
Figure 10C:
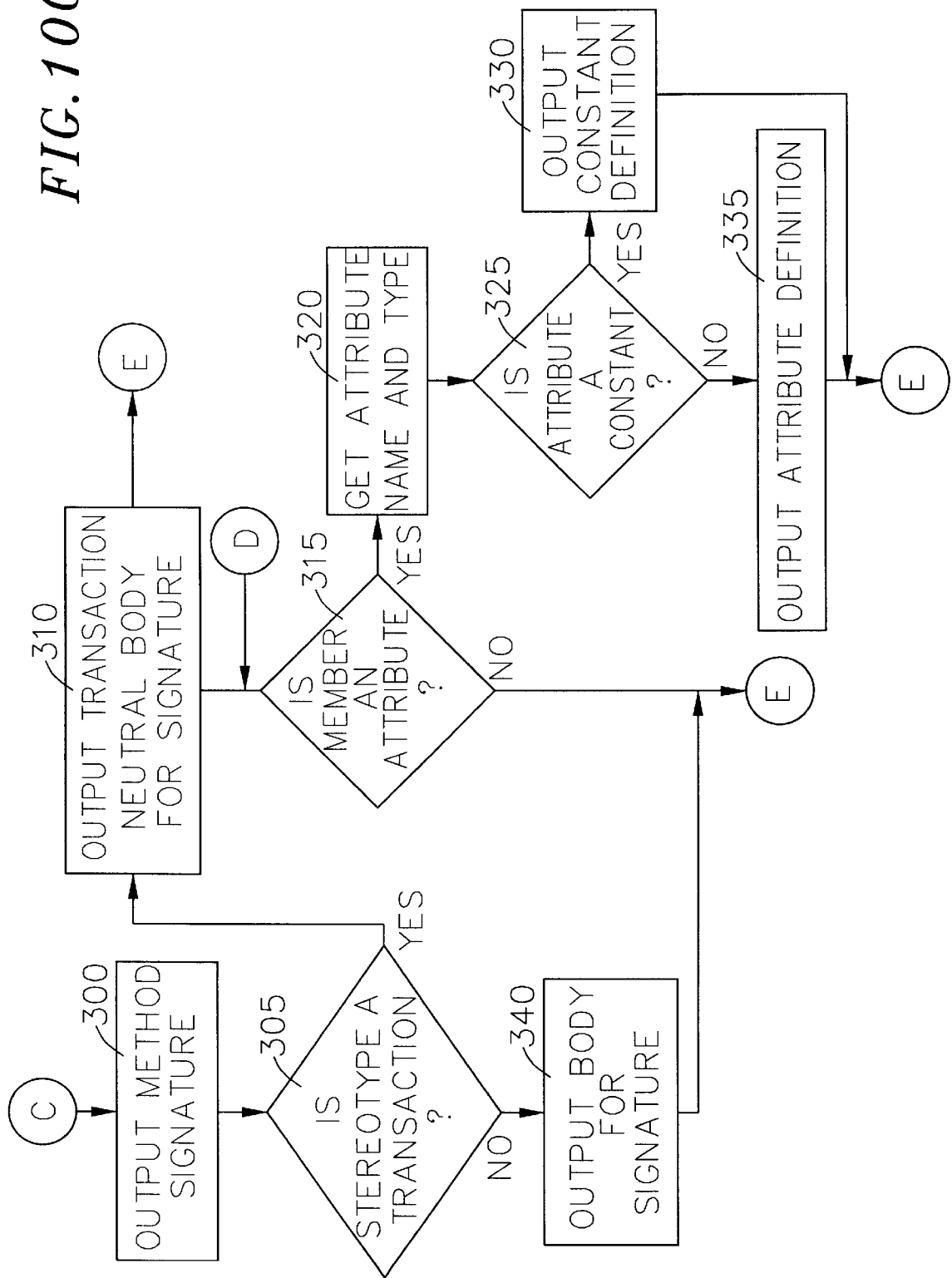

FIGS. 10a–10c are flow diagrams illustrating the creation of a Visual Basic skeleton code during the business logic phase shown in FIG. 1. Skeleton codes for C++, COBOL, and Java may be produced in a similar way.

The creation of the skeleton code begins with the start bubble 180. The user then decides which tool he wants to employ to write the methods. Depending on the tool chosen, a file with the appropriate extension name will be generated to build the classes for the selected component.

Under decision diamond 185, an inquiry is made as to whether or not the user choice is Visual Basic. If it is, a ".vbp" and a ".cls" file are generated 190. If the user choice is not Visual Basic, an inquiry is made to whether or not the choice is C++ (decision diamond 195). If the answer is YES, a ".cpp" file is generated 200.

If the user did not choose C++, a further inquiry is made as to whether or not the selection is COBOL (decision diamond 205). If it is, a ".cbl" file is generated 210. Otherwise, a final inquiry of whether or not the choice is JAVA is made (decision diamond 215). If JAVA is selected, a JAVA file is generated 220.

Next, a Visual Basic skeleton code may be generated for all the classes in a selected component. This is achieved by first making an inquiry as to whether or not there are more classes in the selected component (decision diamond 225). If the answer is NO, the routine will exit 228. But if the answer is YES, it must be determined in decision diamond 230 (FIG. 10B) whether or not Visual Basic was chosen. The NO branch to this inquiry results in a check to determine whether or not there are more classes in the component (decision diamond 225). The YES branch to this inquiry, signifying that the user chose Visual Basic as his tool, results in the generation of an appropriate class header 235.

The next stage of the routine involves performing certain steps for all the members of the class. Therefore, an inquiry is made in decision diamond 240 as to whether or not there are more members in the class. If the answer is YES, the visibility of the member is determined as being either public or private 245.

A member may be a method or an attribute. If the member is a method, as depicted by the YES branch to decision diamond 250, the following steps are invoked. First, all the parameters of the method are checked to determine if the method is a function. If the method is a function, the return type is determined. Thus, an inquiry is made as to whether or not there are more parameters in the method (decision diamond 255). If the answer is YES, a determination must be made in decision diamond 260 as to whether or not the parameter is a return kind. If not, the other parameters of the method are checked. If the parameter is a return kind, then the method is a function 265 and the return type is determined 270.

Second, after all the parameters in the method have been checked, as reflected by the NO branch to decision diamond 255, an inquiry is made in decision diamond 275 as to whether or not the method is a subroutine. If the answer is YES, a determination is made as to whether or not the method is of a PROPERTY_LET (decision diamond 280). But if the answer is NO, a determination is made as to whether or not the method is of a PROPERTY_GET (decision diamond 285).

Third, for each parameter in the method, the routine determines the parameter name and type information. This is accomplished by inquiring in decision diamond 290 whether or not there are more parameters in the method. If so, the parameter name and type information are generated 295.

Fourth, the method signature is produced 300 (FIG 10C).

Finally, an inquiry is made as to whether or not the stereotype of the method is a transaction (decision diamond 305). If it is a transaction, then a transaction neutral body is produced for signature 310. Otherwise, just the body is produced for signature 340. The routine then reverts back to decision diamond 240 (FIG. 10B, via connector E) to determine whether or not there are more members in the class.

Referring back to decision diamond 250, if the member is not a method, as depicted by the NO branch, then an inquiry is made as to whether or not the member is an attribute (decision diamond 315, FIG. 10C). If the answer is YES, then the attribute name and type are obtained 320. Next, an inquiry is made as to whether or not the attribute is a constant (decision diamond 325). If it is a constant, as shown by the YES branch, then the constant definition is produced 330. Otherwise, the attribute is not a constant and the attribute definition is produced 335. The routine then reverts back to decision diamond 240 (FIG. 10B, via connector E) to determine whether or not there are more members in the class.

When there are no more members in the class, as depicted by the NO branch to decision diamond 240, and there are no more classes in the component, as depicted by the NO branch in decision diamond 225 (FIG. 10 A), the routine will exit 228.

The resulting component code can be versioned using off-the-shelf code management tools such as Intersolv PVCS (which is a trademark of Intersolv, Inc.) or Microsoft SourceSafe (which is a registered trademark of Microsoft Corporation). The resulting files are then kept in the repository 20 (see FIG. 1).

The next step in the development flow shown in FIG. 1 may be the building and wrapping of components. This is accomplished during the component building 30 phase. It is the building and wrapping of components which makes them available for use by applications and other components. During this phase, selected components from a selected model are built using third party tools such as MS Development Studio (which is a trademark of Microsoft Corp.), Visual Basic, Micro Focus COBOL or Visual Age for Java (which is a trademark of IBM Corporation).

The key concept in building and wrapping components is the separation of component behavior from the environment it runs in. This allows components to be deployed in different environments. The environment may include middleware, the threading model, object caching, integration with systems management, hooks to make the component testable and tunable, and security.

Middleware decisions may, but need not be made during the component building 30 phase. Middleware options include transactional middleware, such as Microsoft Transactional Server (which is a trademark of Microsoft Corp.) or BEA Tuxedo; messaging middleware, such as IBM MQ (which is trademark of IBM Corporation) or Microsoft MSMQ (which is a trademark of Microsoft); procedural middleware, such as DCOM (which is a trademark of Microsoft Corp.) or CORBA (which is a trademark of Object Management Group, Inc.); or HTML and Internet Server based middleware, such as Microsoft (which is a registered trademark of Microsoft Corp.) or Netscape (which is a registered trademark of Netscape Communications Corporation).

The system is capable of displaying middleware "hints" that are available from the UML model. For example, if a class is transactional, this information is displayed by the system, allowing the user to choose a transactional middleware when middleware decisions must be made.

If, a transactional middleware is chosen, the transactionally neutral code is parsed and coded to handle transactions in the selected transactional middleware. The neutral code is saved in the repository 20 and the same code can be deployed into a different transactional middleware.

If no middleware decision is made, the logic of the built component can be tested without requiring it to be part of the overall infrastructure of the entire application.

The components that are built and the components that the built components call are registered in the repository 20. A linked list of which components are consumed or are consumed by other components is also maintained in the repository 20.

Figure 11A:
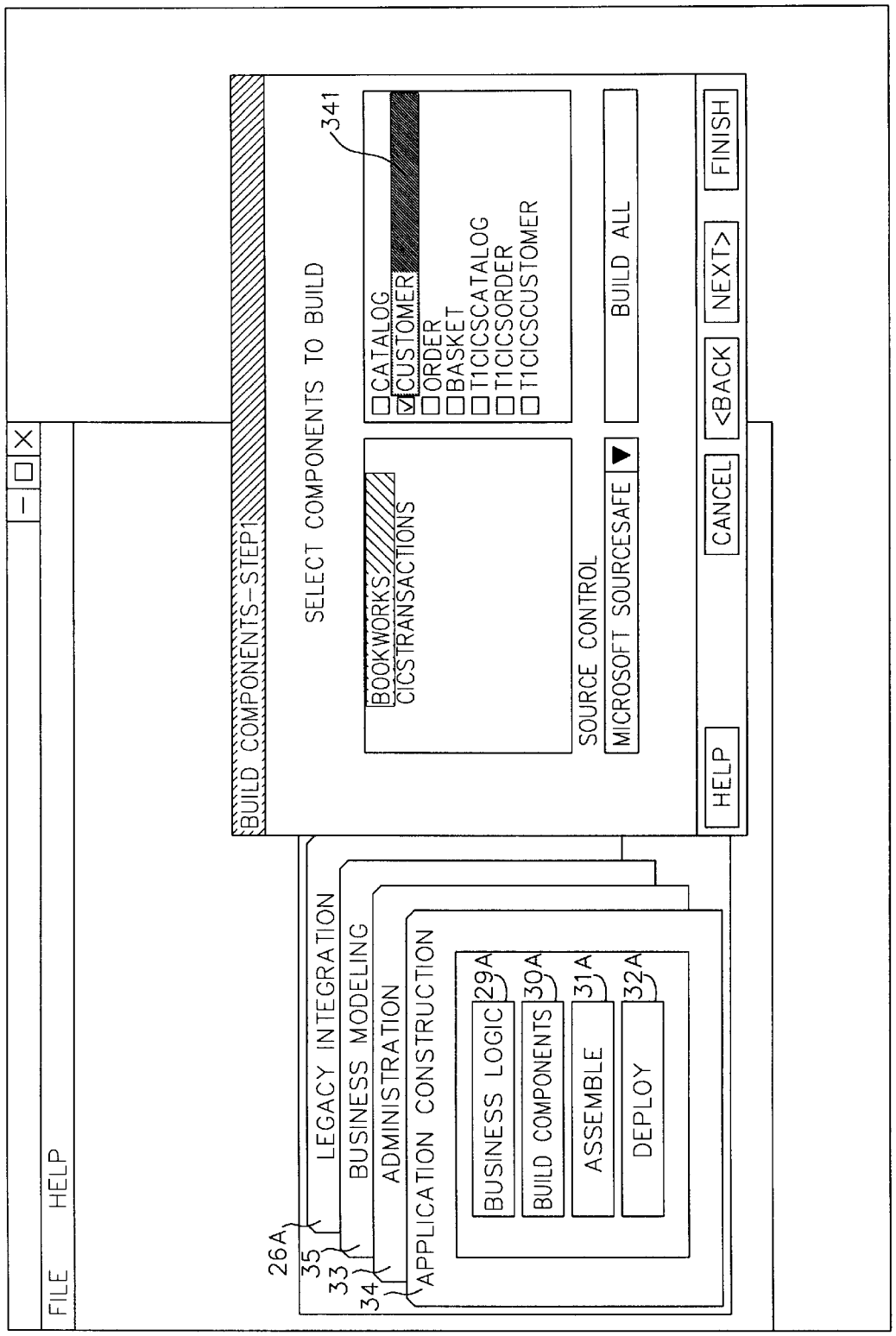
FIGS. 11a–11b illustrate sample screen presentations for the building and wrapping of components during the component building phase.
Figure 11B:
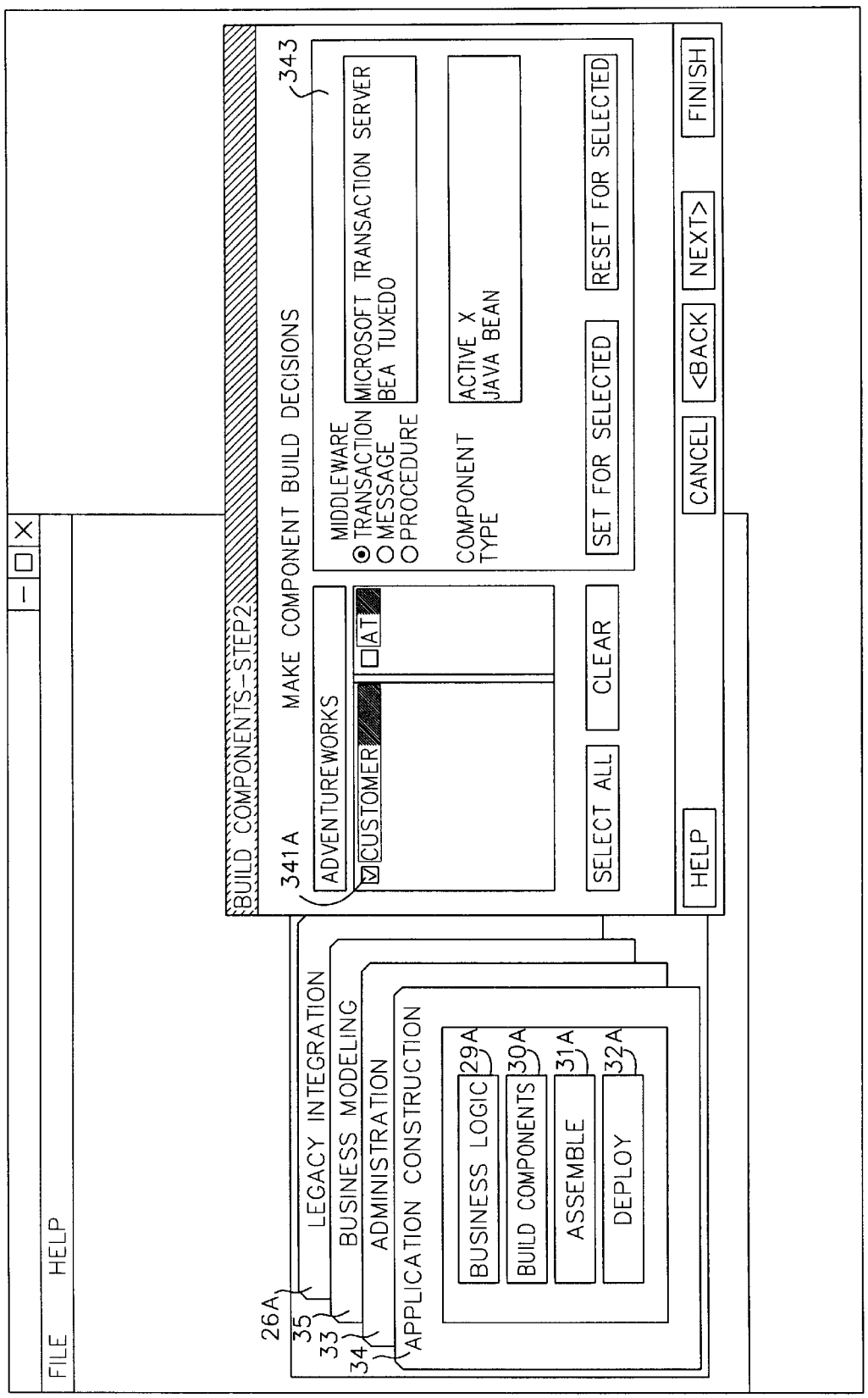

FIGS. 11a–11b show the user interface screens for the component building phase. FIG. 11a illustrates the user's choice to build a component with a Customer class 341 selected from the Books Works model 342. In FIG. 11b, middleware hints 343 for the selected class 341a is displayed. Shown here is the hint that the selected class 341a, the Customer class, is transactional and that transactional middleware such as Microsoft Transaction Server or BEA Tuxedo may be designated as the middleware. The user is also given a choice between ActiveX and JAVA BEAN (which is a trademark of Sun Microsystems, Inc.)

Figure 12:
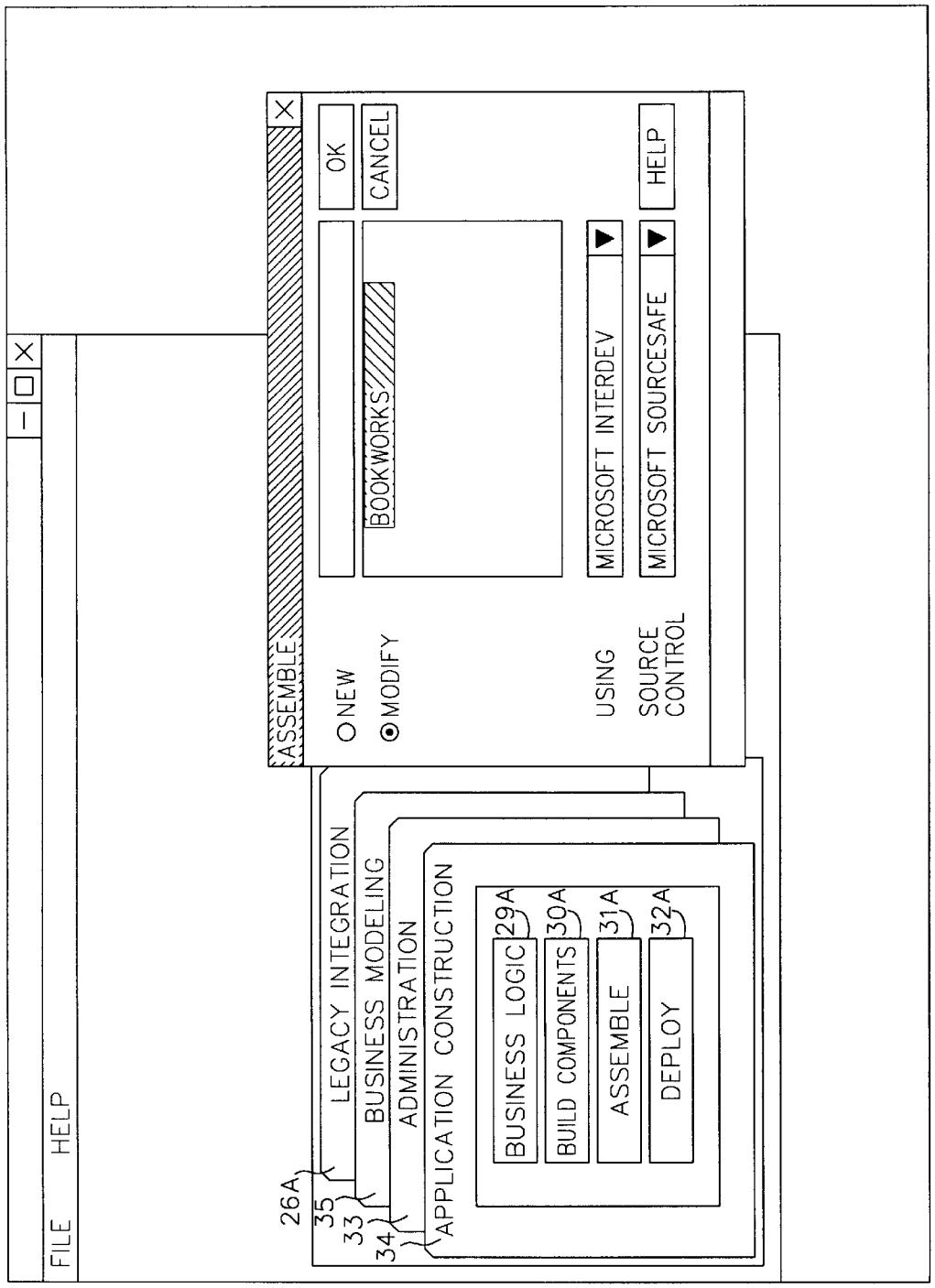
FIG. 12 illustrates a sample screen presentation for the application assembly phase.

Referring back to FIG. 1, applications are constructed from the components built during the component building phase 30. The application assembly 31 process consists primarily of building the logic and structures to link the components together. Assembling applications this way allows a variety of applications to be constructed using the same basic components. FIG. 12 is the user interface screen showing the application assembly process.

Third party tools such as Microsoft InterDev (which is a trademark of Microsoft Corp.), Microsoft Front Page (which is a trademark of Microsoft Corp.), Forte (which is a registered trademark of Forte Software, Inc.), Borland Delphi (which is a trademark of Borland International, Inc.), Microsoft Visual Basic, or Power Builder (which is a trademark of Sybase, Inc.) may be used to assemble previously built components into applications. Application components and the components that these application components call are registered in the repository 20. A linked list of which components are consumed or are consumed by other components is also maintained in the repository 20.

Figure 13:
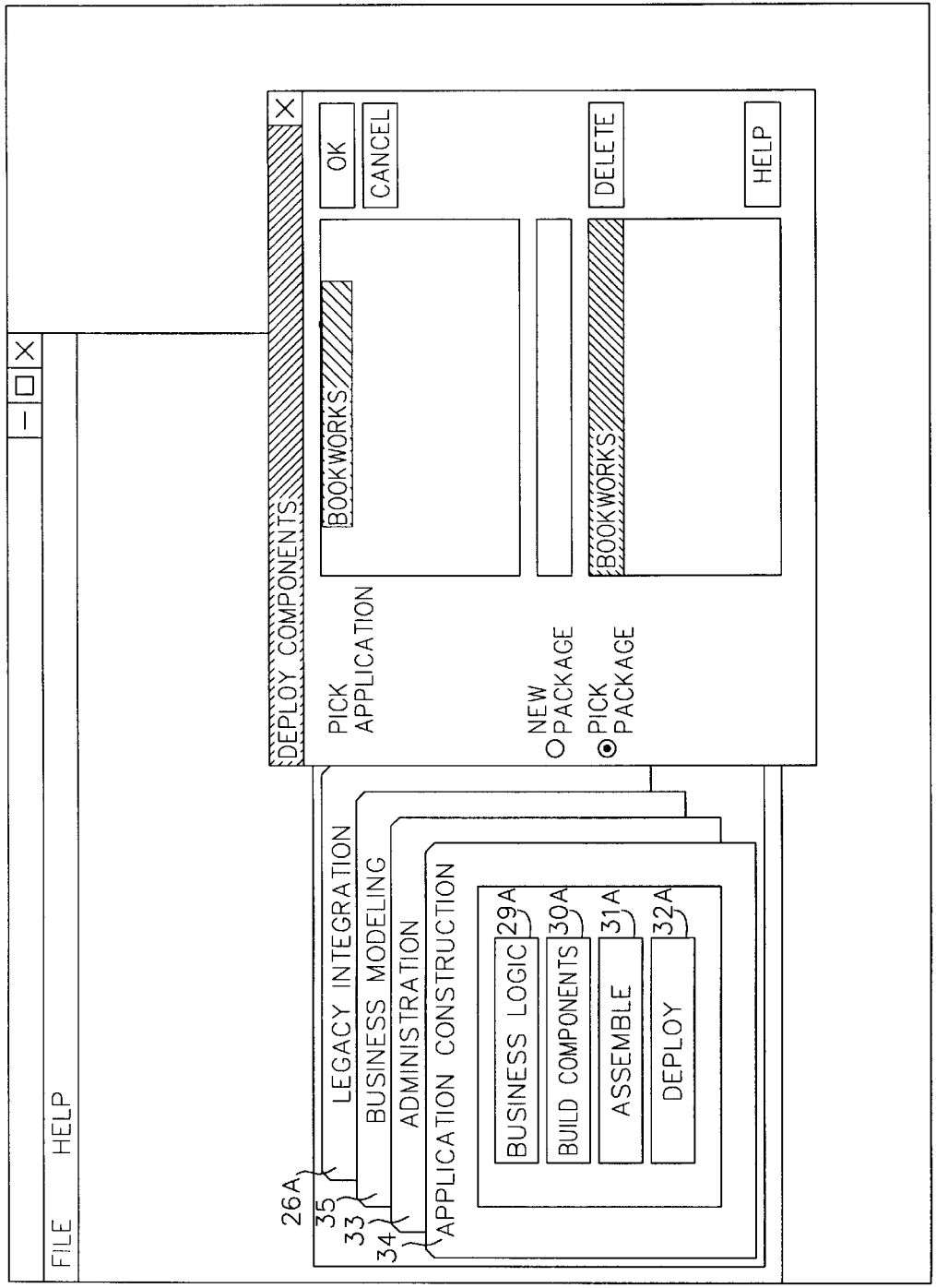
FIG. 13 illustrates a sample screen presentation for the application deployment phase.

The development process shown in FIG. 1 will generally end in the application deployment 32 stage. Deployment takes built applications and installs them in the appropriate environments. FIG. 13 shows the user interface for the application deployment 32 process.

The deployment process also involves verifying that the necessary support software is installed at the right level, physically copying the binary code, and registering the applications in the enterprise directory service.

Deployment information is obtained from third party tools such as CA-Unicenter TNG (which is a registered trademark of Computer Associates International, Inc.) or Microsoft System Management Server (which is a trademark of Microsoft Corp.) These tools further provide utilities that may be employed by a wizard to deploy the software.

Before applications are deployed, however, the various components of the applications are wrapped as packages. The packaged components are then deployed to the appropriate environments. The packaged components are instrumented for systems and application management by appropriate deployment "hints" and management "hints."

Figure 14:
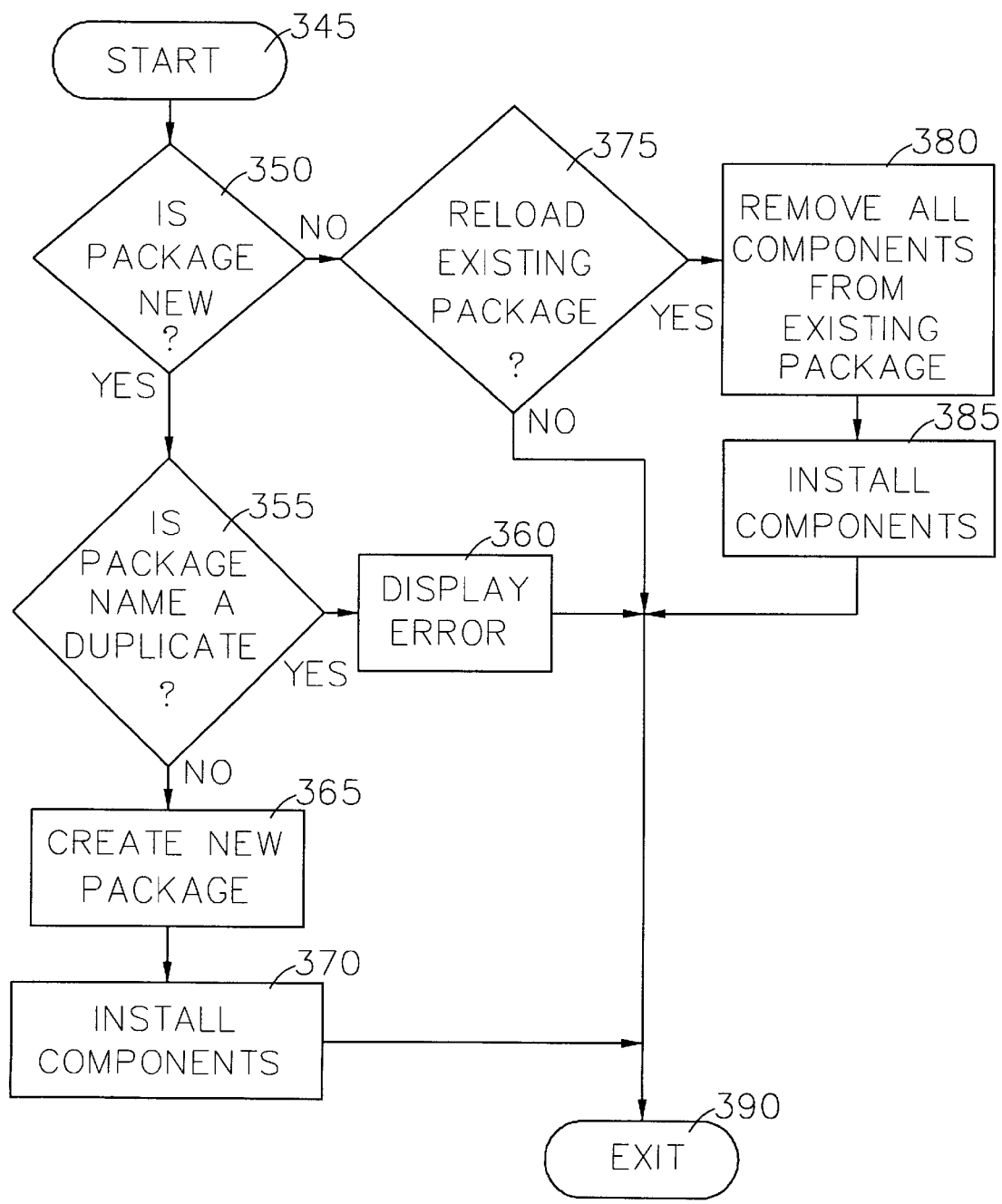
FIG. 14 is a flow chart illustrating how Microsoft Transaction Server registers components into packages during the application deployment phase.

FIG. 14 is a flow chart illustrating how Microsoft Transaction Server registers components into packages. The routine begins at the start bubble 345. From there, an inquiry is made as to whether or not a new package is to be created (decision diamond 350). If the package is new, as depicted by the YES branch, then a further inquiry is made as to whether or not the package name is a duplicate (decision diamond 355). A duplicate package name results in an error message 360 and exit from the routine 390.

If the package name is not a duplicate, as depicted by the NO branch to decision diamond 355, then a new package is created 365 and components are installed into the package 370.

Referring back to decision diamond 350, if a new package is not to be created, then a determination is made as to whether or not an existing package is to be reloaded (decision diamond 375). If the answer is YES, all components from the existing package are removed 380 and new components are installed 385. Otherwise, if an existing package is not to be reloaded, the routine will exit 390.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A system for developing computer applications using a set of development tools, each having an input for receiving input data and each generating output data, said system comprising:

a.) for each of said development tools, means for translating said output data from said development tool into an OMG compliant UML representation of data based on a set of object classes defined and stored in a repository;

b.) said repository also being disposed for storing said output data and the relationship between said output data and said UML representation of data; and, c.) for each of said set of development tools, means for translating said UML representation of data from said repository into input data and supplying said input data to the input of one or more of said development tools.

2. The system of claim 1 wherein said repository further comprises tools for cataloging, browsing and managing representations of said object classes and relationships between said object classes.

3. The system of claim 1 wherein the repository further stores application components and the repository further comprises tools for browsing, searching and installing the application components.

4. The system of claim 1 further comprising means for adding a new development tool to said system comprising means for updating and configuring said means for translating said output data and said means for translating said generalized-format data for said new development tool.

5. The system of claim 1 wherein one of the development tools is a legacy discovery tool.

6. The system of claim 5 wherein, for the legacy discovery tool, the means for translating the output data comprises means for translating the output data into Unified Modeling Language format.

7. The system of claim 1 wherein one of the development tools is a business process modeling tool.

8. The system of claim 7 wherein, for the business process modeling tool, the means for translating the output data comprises means for translating the output data into Unified Modeling Language format.

9. The system of claim 1 wherein one of the development tools is a domain modeling tool.

10. The system of claim 9 wherein, for the domain modeling tool, the means for translating the output data comprises means for translating the output data into Unified Modeling Language format.

11. The system of claim 1 further comprising means for generating skeleton code from the data stored in the repository.

12. The system of claim 11 further comprising means for storing representations of the generated skeleton code in the repository.

13. The system of claim 1 wherein one of the development tools is a component building tool.

14. The system of claim 1 wherein one of the development tools is an application building tool.

15. The system of claim 1 wherein one of the development tools is an application deployment tool.

16. A computer system having a repository program being executed therein and a framework that includes an OMG compliant UML representation of artifacts needed for integrating software development tools into said system, and for building, deploying and maintaining applications in a heterogeneous development framework, said framework comprising:

a. a legacy integration module for discovering and transforming pre-existing applications into object models;

b. an enterprise modeling module for creating and saving business models derived from a business modeling tool;

c. a domain modeling module for creating object models from said business models;

d. a business modeling module for writing the methods for business processes based on said business model in said domain modeling module;

e. a component building and wrapping module for wrapping said business models into components and containing a multiplicity of component interfaces useful in building applications;

f. an application and assembly module disposed in said repository for assembling built components into an application; and, g. an application deployment module disposed in said repository for deploying new applications.

17. The system of claim 16 wherein said legacy integration module interfaces with a legacy discovery tool capable of translating output data therefrom into a Unified Modeling Language format.

18. The system of claim 16 wherein said business modeling module interfaces with a business process development tool capable of translating output data therefrom into a Unified Modeling Language format.

19. The system of claim 16 wherein said domain modeling module interfaces with a domain modeling tool capable of translating output data therefrom into Unified Modeling Language format.

20. The system of claim 16 further comprising means for generating skeleton code from data stored in said repository.

21. The system of claim 20 further comprising means for storing representations of said generated skeleton code in said repository.

22. The system of claim 16 wherein said component building and wrapping module interfaces with a component building development tool.

23. The system of claim 16 wherein said application and assembly module interfaces with an application building development tool.

24. The system of claim 16 wherein said application deployment module interfaces with an application deployment development tool.

* * * * *